Patented July 2, 1935

2,006,766

UNITED STATES PATENT OFFICE 2,006,766

PROCESS FOR MANUFACTURING HYDROPHILOUS FATTY SUBSTANCES

Richard Hueter, Villa Waldfrieden, Rosslau/Anhalt, Germany, assignor, by mesne assignments, to "Unichem" Chemikalien Handels A.-G., Zurich, Switzerland, a corporation of Switzerland No Drawing. Application June 11, 1932, Serial No. 616,759. In Germany June 12, 1931

8 Claims. (Cl. 87—12)

It has been found that by hydrating liquid train-oils, which belong in their chemical character to the waxes, substances are obtained, which possess in a surprising manner the property of simultaneously and homogeneously combining as well with water as with fatty substances waxes or liquid hydrocarbons. Such train-oils are for instance the liquid waxes known under the names "sperm"-, "arctic-sperm"- or "physet"-oil as obtained from the marine mammals belonging to the "physeter" and "hyperoodon" groups. These liquid waxes in contrast to the normal fats and oils contain fatty acids, which rarely are found as glycerine esters but mostly as higher alkyl-esters, especially esters of unsaturated alcohols.

Those fatty substances as obtained by hydrating natural train-oils of wax-like character which contain hydroxyl-groups, possess properties, which are very similar both to products being used generally in the leather-treating industry (degras or moellon) and to woolfat-products, such as lanolin, but which with respect to their water-adsorption capacity surpass commercial lanolin. Therefore the described products are especially of a great value, where it is necessary as for instance in the leather treating industry that the fatty substances penetrate moist substances or that they are mixed homogeneously with water. According to their use the new substances may be combined with mineral oils or with ordinary fats (train-oils). They produce mixtures with hydrophilous properties which dependent upon their content of hydrated liquid waxes may be standardized in an optional manner.

It is known already to produce fatty substances similar to degras by artificial oxidation of train-oil-fatty acids or their glycerides by blowing-in of air. However as is well known highly oxidized fatty acids are the supporters of the specific degras-property. In contrast hereto the new products contain esters of fatty acids and hydroxy higher molecular alcohols, which were not known hitherto as having degraslike properties per se or in combination with other fatty substances. Furthermore in using the above mention liquid waxes the protracted and not uniformly proceeding process of oxidation may be dispensed with, and it is rather sufficient to apply reactions, which are simple and always uniform, i. e. the saturation of double-bonds by water adding reactions in order to obtain highly valuable hydrophilous fatty substances.

Example.—Similar parts by weight of arctic sperm-oil separated by means of filtration at 8° C. from the solid parts and concentrated sulfuric acid are well mixed at temperatures of —5° to 0° C. and introduced during stirring in the fivefold quantity of water. Now the whole is heated up to 90°-100° C. for four hours by direct steam in order to split the possibly still existing sulfuric acid esters. Then the aqueous sulfuric acid after deposition of the fat is removed in the usual manner. The reaction product is solidifying while cooled and may be skimmed off. It still contains traces of aqueous sulfuric acid which by neutralization with soda ash is made innocuous or may be removed by washing with water. By boiling with water while simultaneously adding 3% hydrogen peroxide (30%) a light-yellowish bleached product which contains some sulfuric acid esters which are not converted is obtained (drop point according to Ubelohde 38° C.) which renders when stirred with water a completely homogeneous salve. In the same manner mixtures of about 80 parts by weight of whale oil and 20 parts by weight of hydrated arctic sperm-oil yield by stirring together with water a uniform product which when brushed on damp leather penetrates uniformly the same and does not exude when stored.

It is not essential to carry out the above process in such a manner that a quantitative saturation of the existing double-bonds takes place. The product obtained according to the above example shows for instance an iodine value of 14.9, in contrast to the raw product which has an iodine value of 88. The acetyl value of the alcohol mixture as obtained by saponification of the reaction-mass is 282. The acid number on the other hand is only slightly increased by the hydrating process depending on the quality and contents respectively of the starting material as to free fatty acids and other impurities as fatty glycerides.

Besides effecting by use of sulfuric acid the hydroxylation of unsaturated alkyl-esters present in natural train-oils may be effected by other means. As such may be mentioned for instance treating with permonosulfuric acid the addition of halogen or hydrogen halide with subsequent splitting off halogen, the influence of hypochlorous acid. But for technical purposes the above described process of treating with sulfuric acid will be chiefly taken into consideration.

I claim:

1. Process for manufacturing substances, which can be mixed simultaneously with water and animal oils, characterized in that sperm oil of the wax ester type, which is separated at 8° C. by means of filtration from the solid portions is carefully mixed with concentrated sulfuric acid at temperatures of —5° C. up to 0° C., then having settled the mixture for 8 hours, diluting with the fivefold quantity of water for four hours at 90° C. to 100° C. with steam and separating off the reaction-product from the acid-water.

2. The process of producing hydrophilous substances which comprises filtering sperm oil which consists chiefly of wax esters at a temperature approximately 8° C., reacting the filtrate with concentrated sulfuric acid at a temperature approximating —5° to 0° C., allowing the reaction mixture to settle for a period of the order of eight hours, diluting the product with a quantity of water of the order of five times the quantity of the reaction mixture, heating to a temperature approximating 90 to 100° C., for a period of the order of four hours and separating off the reaction product.

3. The process of producing hydrophilous substances which comprises filtering artic sperm oil at a temperature approximating 8° C., reacting the filtrate with concentrated sulfuric acid at the double bond position to form sulfuric acid reaction products, diluting the reaction mixture with water amounting to several times the amount of the mixture and heating the diluted mixture to break down the sulfuric acid reaction product and to substitute OH groups for sulfuric acid groups removed.

4. As a composition of matter the product produced by the process outlined in claim 2.

5. As a composition of matter the product produced by the process outlined in claim 3.

6. A hydrophilous composition consisting of a mixture of hydroxy wax esters of sperm oil including a small proportion of the reaction products of sulfuric acid and unsaturated esters which composition results from the reaction of those fractions of sperm oil of the wax ester type which are liquid at 8° C. with sulfuric acid to introduce sulfuric acid groups at the double bond position and reacting the sulfuric acid esters with water to substitute OH groups for sulfuric acid groups, substantially as described.

7. The process of producing hydrophile substances which comprises reacting unsaturated wax esters with concentrated sulfuric acid to form sulfuric acid esters by reaction at the double bond position diluting the reaction mixture with water and heating the diluted mixture to break down the sulfuric acid reaction product to substitute OH groups for some of the sulfuric acid groups.

8. As a composition of matter, the product produced by the process outlined in claim 7.

RICHARD HUETER.